(12) United States Patent  
Beeston et al.

(10) Patent No.: US 9,229,829 B2
(45) Date of Patent: Jan. 5, 2016

(54) SYNCHRONOUS MODE REPLICATION TO MULTIPLE CLUSTERS

(75) Inventors: Ralph T. Beeston, Tucson, AZ (US); Erika M. Dawson, Tucson, AZ (US); Gavin S. Johnson, San Jose, CA (US); Katsuyoshi Katori, Kanagawa (JP); Joseph M. Swingler, Tucson, AZ (US)

(73) Assignee: GLOBALFOUNDRIES, INC., Grand Cayman (KY)

( * ) Notice: Subject to any disclaimer, the term of this patent is extended or adjusted under 35 U.S.C. 154(b) by 182 days.

(21) Appl. No.: 13/558,274

(22) Filed: Jul. 25, 2012

(65) Prior Publication Data

US 2014/0032957 A1  Jan. 30, 2014

(51) Int. Cl.
*G06F 11/20* (2006.01)
*G06F 3/06* (2006.01)

(52) U.S. Cl.
CPC ............ *G06F 11/2097* (2013.01); *G06F 3/065* (2013.01); *G06F 11/2094* (2013.01)

(58) Field of Classification Search
CPC ............................ H04L 19/14; G06F 11/2028
USPC ......................................................... 714/1–57
See application file for complete search history.

(56) References Cited

U.S. PATENT DOCUMENTS

| | | | | |
|---|---|---|---|---|
| 5,146,576 A * | 9/1992 | Beardsley et al. | | 711/113 |
| 6,026,465 A * | 2/2000 | Mills et al. | | 711/103 |
| 6,907,543 B2 * | 6/2005 | Hino et al. | | 714/4.4 |
| 7,013,372 B2 * | 3/2006 | Achiwa et al. | | 711/162 |
| 7,031,986 B2 * | 4/2006 | Ito | | 707/649 |
| 7,275,142 B1 * | 9/2007 | Schultz et al. | | 711/162 |
| 7,571,168 B2 * | 8/2009 | Bahar et al. | | 1/1 |
| 7,702,947 B2 * | 4/2010 | Peddada | | 714/4.1 |
| 7,721,058 B2 * | 5/2010 | Satoyama et al. | | 711/162 |
| 7,882,286 B1 * | 2/2011 | Natanzon et al. | | 710/74 |
| 8,099,622 B2 * | 1/2012 | Shitomi et al. | | 714/3 |
| 8,301,593 B2 * | 10/2012 | Hoffmann et al. | | 707/615 |
| 8,341,115 B1 * | 12/2012 | Natanzon et al. | | 707/613 |
| 8,370,679 B1 * | 2/2013 | Gawali et al. | | 714/3 |
| 8,386,430 B1 * | 2/2013 | Myhill et al. | | 707/640 |
| 8,407,301 B1 * | 3/2013 | Pendharkar | | 709/206 |
| 2005/0027748 A1 * | 2/2005 | Kisley | | 707/200 |
| 2005/0050115 A1 * | 3/2005 | Kekre | | 707/204 |
| 2005/0154085 A1 * | 7/2005 | Martini et al. | | 523/210 |
| 2005/0262296 A1 | 11/2005 | Peake | | |
| 2007/0234108 A1 * | 10/2007 | Cox et al. | | 714/6 |
| 2008/0250086 A1 * | 10/2008 | Kisley | | 707/204 |
| 2011/0022879 A1 * | 1/2011 | Chavda et al. | | 714/1 |
| 2011/0083033 A1 | 4/2011 | Maki et al. | | |
| 2012/0023209 A1 * | 1/2012 | Fletcher et al. | | 709/223 |
| 2012/0233118 A1 * | 9/2012 | Holt et al. | | 707/620 |
| 2013/0332770 A1 * | 12/2013 | Thiel et al. | | 714/15 |
| 2014/0075114 A1 * | 3/2014 | Benhase et al. | | 711/114 |

\* cited by examiner

*Primary Examiner* — Amine Riad
(74) *Attorney, Agent, or Firm* — David W. Victor; Konrad Raynes Davda & Victor LLP

(57) ABSTRACT

Provided are a computer program product, system, and method for synchronous mode replication to multiple clusters receiving a write to a volume from a host. A received write is cached in a memory. A determination is made of a replication rule indicating one of a plurality of replication modes for a first cluster and a second cluster used for replication for the write, wherein one of the replication modes comprises a synchronous mode. A determination is made that the replication rule indicates a synchronous mode for the first and the second clusters. The write is transmitted from the memory to the first cluster to store in a first non-volatile storage of the first cluster and to the second cluster to store in a second non-volatile storage in response to determining that the replication rule indicates the synchronous mode.

33 Claims, 6 Drawing Sheets

Cluster Rule

Replication Rule

Cluster Rule

Volume Options

Cluster Information

SYNCHRONOUS MODE REPLICATION TO MULTIPLE CLUSTERS

BACKGROUND OF THE INVENTION

1. Field of the Invention

The present invention relates to a computer program product, system, and method for synchronous mode replication to multiple clusters.

2. Description of the Related Art

A replication manager replicates data to multiple different clusters so that copies of the data are maintained at multiple sites and updated to provide consistent and synchronized copies of the data at the different cluster sites. In a virtual tape library (VTL) environment, the clusters to which host data is replicated may comprise virtual tape libraries that store tape formatted data on a non-tape storage, such as disk, that emulates tape with a faster access profile. VTLs may also be used with physical tape providing backup storage of the VTLs. Policy settings indicate how the data is to be replicated to the clusters. Two common replication settings for replicating host data to VTL clusters include immediate copy and deferred copy.

With the deferred copy mode, after the host job/application finishes with a volume, a copy of the data (logical volume) is queued for later execution, such as after the issuance of the rewind/unload (RUN) command during demount processing, which may occur minutes to hours after being queued. With the immediate copy mode, after the host job/application finishes with a volume, a copy of the volume to a remote location is made while the library holds device-end on the rewind/unload (RUN) command. In this case, device-end is held until the copy completes to a remote location, which could be several minutes.

The above deferred and immediate copy modes are performed at a cluster transparent to the host operations. Another technique for replicating host writes to multiple clusters and ensure a Recovery Point Objective (RPO) of zero, which means no risk of losing data, is for the host to perform a host process of tape duplexing, where the host write does not complete until the data is confirmed copied to the two clusters. Host tape duplexing provides data protection at synchronize command granularity (as the data was being written) with two tapes in the same or different library being simultaneously written to (the primary and the alternate). Host tape duplexing may require manual intervention if the alternate copy is needed and may introduce overhead in the host application because the host must perform the duplexing and tracking of the two duplexed copies.

Host tape duplexing is implemented in the International Business Machines Corp. (IBM) z/OS DFSMShsm product. (z/OS and IBM are trademarks of International Business Machines Corp. in the United States and other countries).

There is a need in the art for improved techniques for replicating host writes to cluster sites.

SUMMARY

Provided are a computer program product, system, and method for synchronous mode replication to multiple clusters receiving a write to a volume from a host. A received write is cached in a memory. A determination is made of a replication rule indicating one of a plurality of replication modes for a first cluster and a second cluster used for replication for the write, wherein one of the replication modes comprises a synchronous mode. A determination is made that the replication rule indicates a synchronous mode for the first and the second clusters. The write is transmitted from the memory to the first cluster to store in a first non-volatile storage of the first cluster and to the second cluster to store in a second non-volatile storage in response to determining that the replication rule indicates the synchronous mode.

DETAILED DESCRIPTION

Described embodiments provide techniques to replicate data from a host to multiple clusters. In certain embodiments, the clusters may emulate tape storage on faster access non-volatile storage devices, such as disks, etc. Replication rules provided for the clusters may indicate for volumes that two clusters have a synchronous mode and one or more other clusters have a deferred mode where the volume is copied to a remote cluster after the host has completed accessing the volume in a cluster. For the clusters having the synchronous mode, writes are transmitted from the memory of a cluster to clusters having the synchronous mode to store in non-volatile storages of the synchronous mode clusters. Described embodiments provide replication of data to multiple clusters with less overhead than current techniques and less manual intervention and while maintaining a zero recovery point objective at synchronization point granularity. Further, the described embodiments may apply to any multi-node/cluster solution that stores data objects using sequential methods.

Figure 1:
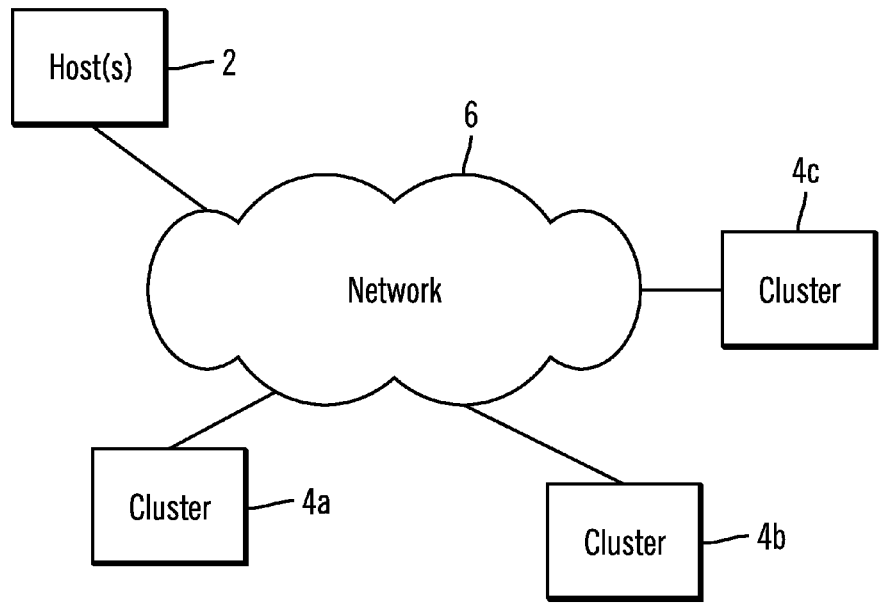
FIG. 1 illustrates a replication environment in which embodiments are implemented.

FIG. 1 illustrates an embodiment of a replication computing environment having one or more hosts 2 and clusters 4a, 4b, 4c that communicate over a network 6. The hosts 2 execute applications that generate data that may be replicated to the clusters 4a, 4b, 4c. One of the clusters 4a may comprise a local cluster in the network 6 with respect to the host 2. Another of the clusters 4b may comprise an intermediate or metro cluster in closer proximity to the host 2 than the remote cluster 4c but further away than the local cluster, such as in a different building different part of the same city, etc. A remote cluster 4c may be the furthest distance from the host 2, such as in a different city, country, geographical region, etc. In this way multiple copies of volumes in the hosts 2 may be maintained in different areas in the event data needs to be recovered, where the remote copies provide recovery in the event of a proximate disaster at the site of the local 4a and intermediate 4b clusters.

The network 6 is shown as providing connections among the host 2 and the clusters 4a, 4b, 4c. In further embodiments, the network 6 may be implemented with a direct connection from the host 2 to one or more of the clusters 4a, 4b, 4c, such as using a FICON attachment, and then the clusters 4a, 4b, 4c may communicate over a separate cluster network. Thus, the host 2 may have its own network providing connection to the clusters 4a, 4b, 4c, and a separate network is used to interconnect the clusters 4a, 4b, 4c. In this way, the duplexing occurs then through the network the clusters 4a, 4b, 4c share with each other, which may be separate from the network the host 2 uses to communicate with one or more of the clusters 4a, 4b, 4c.

Figure 2:
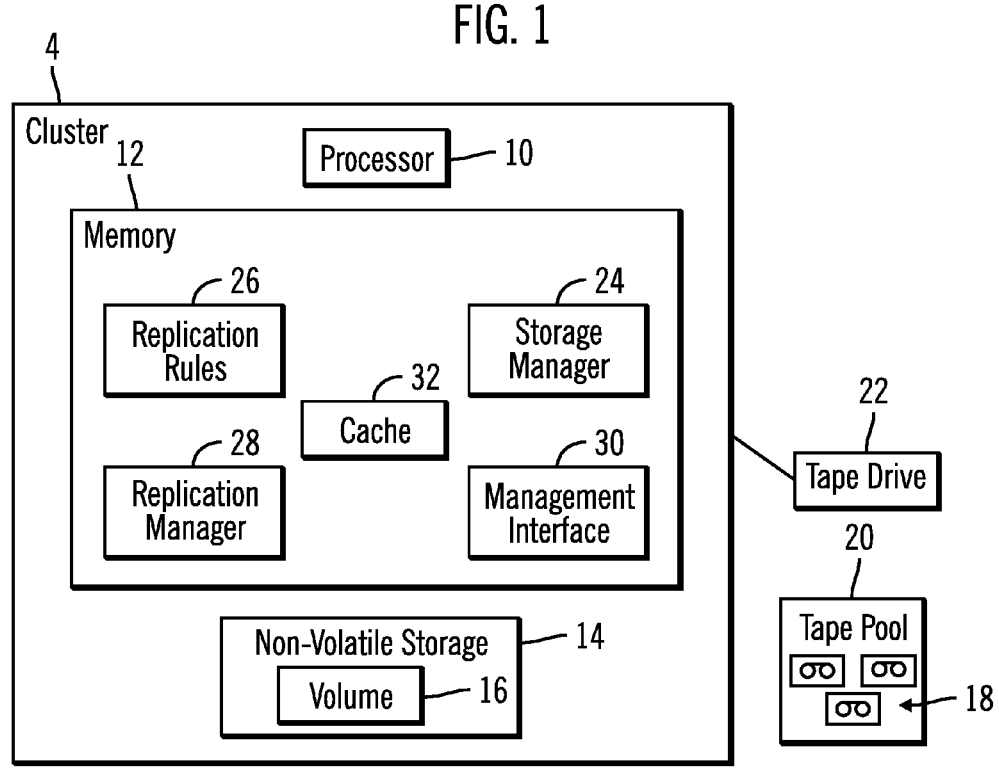
FIG. 2 illustrates an embodiment of a cluster.

FIG. 2 illustrates an embodiment of a cluster 4, of which clusters 4a, 4b, 4c are instances. The cluster 4 includes a processor 10, volatile memory 12, and a non-volatile storage 14 to store tape volumes 16 recalled from tapes 18, or other sequential access storage media, in a tape pool 20. The cluster 4 may be coupled to or includes a tape drive 22, or other sequential access drive, in which the tapes 18 may be loaded to access. The tape drive 22 may comprise one or more bays in which tapes 18 may be inserted. In further embodiments, the tape drive 22 may comprise an automated tape library with robotic components to automate tape 18 storage, access and loading into the drive bays. In certain embodiments, the cluster 4 may not be coupled to a tape drive 22 to access a tape pool 20 and tapes 18 when the volume 16 is maintained in non-volatile storage 14 without backup to tape.

The memory 12 includes various programs loaded from storage (such as storage 14 or other storage) executed by the processor 10, including a storage manager 24 to manage Input/Output (I/O) requests to the volumes 16 in the non-volatile storage 14; replication rules 26 providing rules for replicating volumes 16; a replication manager 28 to apply the replication rules 26 to replicate volumes 16 in the non-volatile storage 14; a management interface 30 to optionally provide a user interface, such as a command line interface or Graphical User Interface (GUI), to allow a user or administrator to configure the settings for the replication rules 26; and a cache 32 to cache read and write requests and data from host 2 applications.

Although the replication manager 28, management interface 30, and storage manager 24 are shown as separate components, they may be implemented as part of a same program or separate programs that interact. In additional embodiments, the storage manager 24, replication manager 28, and management interface 30 may be implemented with hardware logic, such as in one more Application Specific Integrated Circuits (ASICs), or a combination of hardware logic and computer executable code.

In one embodiment, the cluster 4 and storage manager 24 implements a virtual tape library (VTL), such as a virtual tape server (VTS), to present to the hosts 2 the non-volatile storage 14 as a tape library or tape drive. In certain embodiments, the non-volatile storage 14 comprises a faster access storage media and device than the tape drive and media technology (or other sequential access storage media) being emulated in the non-volatile storage 14. In this way, the non-volatile storage 14 emulates tape drives using a faster access storage media to provide multiple virtual tape-drive images and stacking of the virtual tape volumes onto multiple physical tape drives. For instance, the non-volatile storage device 14 may comprise one or more magnetic hard disk drives, solid state storage devices (e.g., EEPROM (Electrically Erasable Programmable Read-Only Memory), flash memory, flash disk, Solid State Devices (SSD), storage-class memory (SCM)), electronic memory, etc.

Figure 3:
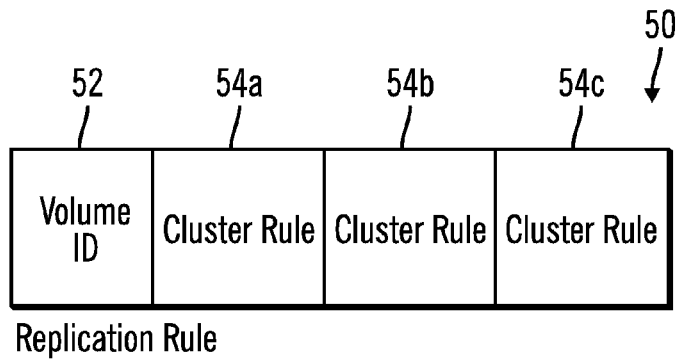
FIG. 3 illustrates an embodiment of a replication rule.

FIG. 3 illustrates an embodiment of an instance of a replication rule 50 included in the replication rules 26, including a volume identifier (ID) 52 identifying the volume to which the rule 50 applies and a plurality of cluster rules 54a, 54b, 54c. Although three cluster rules 54a, 54b, 54c are shown corresponding to the clusters 4a, 4b, 4c there may be two or more than three cluster rules depending on the number of clusters in the replication environment.

Figure 4:
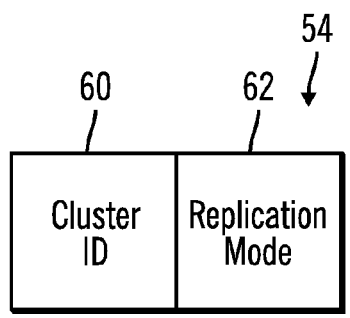
FIG. 4 illustrates an embodiment of a cluster rule within the replication rule.

FIG. 4 illustrates an embodiment of a cluster rule 54, of which rules 54a, 54b, 54c comprise an instance, including a cluster identifier (ID) 60 identifying one of the clusters 4a, 4b, 4c in the replication environment and a replication mode 62 assigned to the cluster 60 for the volume 52 for which the cluster rule 54a, 54b, 54c is provided. In this way, an identified volume 52 may have different replication modes 62 for each cluster 60 for which a cluster rules 54a, 54b, 54c is provided. Further, different 52 volumes may have different replication modes 62 with respect to different clusters 60.

The replication mode 62 may be set initially to one of a plurality of modes, including a synchronous mode, a deferred mode, or no replication for that identified cluster 60 and volume 52. The deferred mode comprises a replication mode that replicates/synchronizes a volume after host access to the volume 16 completes, such as an immediate copy or deferred copy. The replication/synchronization may be considered complete when the volume data is stored in the non-volatile storage 14 of the cluster identified in the cluster rule 54. With immediate copy, after the host issues a close command, a copy of the volume 16 is transmitted to the cluster 60 specified in the cluster rule 54 having the immediate copy mode 62. During immediate copy, device end is held to defer the rewind/unload command (RUN) of the volume 16 until the copy of the volume 16 completes, i.e., is confirmed stored in the cluster non-volatile storage 14, which can take several minutes. With the deferred copy, after the host 2 finishes with a volume 16, a copy of the volume 16 is queued for later replication/synchronization. In a synchronous mode, upon receiving a write, the write is immediately transmitted to two clusters identified in the cluster rules 54a, 54b, 54c as having the synchronous mode replication mode 62, which may include the local cluster 4a, 4b, 4c that received the write or clusters 4a, 4b, 4c external to the cluster receiving the write.

The replication mode 62 may further be set to a synchronous deferred mode if the synchronization of the writes to a volume in the non-volatile storage 14 of a cluster set to synchronous mode cannot be confirmed. In this synchronous deferred mode, writes for the volume can continue to be made to the cluster without requiring that synchronization has been confirmed. The synchronous deferred mode for the volume 16 in the cluster 4a, 4b, 4c is switched back to synchronous mode after the volume data is confirmed synchronized or stored in the non-volatile storage 14 in the cluster 4a, 4b, 4c having the synchronous deferred mode.

Figure 5:
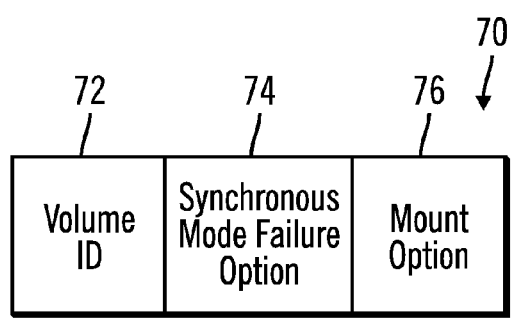
FIG. 5 illustrates an embodiment of volume options for replication.

FIG. 5 illustrates an embodiment of volume options 70 the replication manager 28 may maintain for a volume, including an identifier of a volume 72, a synchronous mode failure option 74, and a mount option 76. The synchronous mode failure option 74 is used to determine how to proceed if the synchronization of the synchronous mode clusters cannot be confirmed during a synchronization operation. The synchronization operation may be initiated in response to an explicit synchronization command from the host 2 or by an implicit synchronization command, which is a command where synchronization may not have been the intended reason for the command, but where synchronization is performed as part of the command. Examples of implicit tape synchronization commands the host 2 may issue include Rewind, Rewind Unload, Synchronize Buffer, Forward Space Block, Forward Space File, Backward Space Block, Backward Space File, Erase Gap, Data Security Erase, Locate Block, Read Forward, Read Previous, Read Backwards (and there is buffered write data), Logical end of volume point is reached.

The synchronous mode failure option 74 may indicate "fail job" or "downgrade to synchronous deferred mode". Indication of "fail job" causes the explicit or implicit synchronization operation to fail if at least one of the two synchronous mode clusters fails to confirm that the writes to a volume have been synchronized to the non-volatile storage 14 as part of a synchronization operation. Indication of "downgrade to synchronous deferred mode" downgrades the synchronous mode for the volume 16 in the cluster 4a, 4b, 4c at which synchronization could not be confirmed to the non-volatile storage 14 to the synchronous deferred mode. In synchronous deferred mode, the synchronous volume in the cluster may remain out of synchronization, and may be later synchronized as part of a deferred mode replication operation. In another embodiment, an operation such as a write may fail if the lack of synchronization is detected prior to the implicit or explicit synchronization point.

The "fail job" synchronous mode failure option 74 is suitable for those host 2 jobs which must operate with a zero Recovery Point Objective (RPO) for all workloads (requiring two copies in two clusters with no lag) at sync point granularity. This will result in failure in the event the volume cannot be synchronized at the two synchronous mode cluster locations. The downgrade to synchronous deferred mode is suitable for jobs which have more relaxed RPO requirements, and write operations are allowed to continue so long the volume is synchronized at one of the two synchronous mode cluster locations.

A volume may fail to synchronize for a number of reasons, including one of the synchronous mode clusters is not present when the volume was mounted or the job that started to write; one of the synchronous mode clusters failed while it was being updated; communication between the cluster being accessed and one of the synchronous mode locations became degraded making the other synchronous mode cluster inaccessible; and one of the synchronous mode clusters is operating at very degraded in performance and the host 2 job would not want its performance dependent on the slower operating synchronous mode cluster. When all sync-deferred jobs have caught up with an asynchronous replication approach (i.e. a deferred copy mode operation), the synchronous deferred volume will return to the synchronous mode state.

The mount option 76 may indicate dual open or single open. For a dual open mount, the volume 16 must be recalled from tape 20 and made available in the non-volatile storage 14 in both synchronous mode clusters. In certain embodiments, there are only two synchronous mode clusters. In embodiments where there are two or more synchronous mode clusters, the volume 16 may be recalled from tape 20 into each synchronous mode cluster in the event the volume 16 is not already cached in the non-volatile storage 14 and only maintained on a back-end tape 18. Each synchronous mode cluster 4a, 4b, 4c may have its own tape drive 22 and tape 20 copy of the volume 16 to recall. In further embodiments, if there are multiple synchronous mode clusters 4a, 4b, 4c, then the data for each of the synchronous mode clusters 4a, 4b, 4c must be recalled into the cache 32 for operations.

This dual open mode is selected for host 2 applications requiring synchronous updates during appends/writes to a specific volume 16, such as the case for a private mount. If both locations are successfully opened, all reads will utilize the primary location. In certain embodiments, if a host read fails, the read will be failed and there may be no failover to the secondary source. If a write occurs, both locations will receive the write data and must synchronize during an implicit or explicit synchronize operation. If the dual option is used, both synchronous mode cluster copies of the volume 16 must be available and any write will continue to duplex to both synchronous mode clusters. In the event both synchronous mode clusters cannot be opened, any location in the grid of clusters 4a, 4b, 4c may be used to provide read access, but if a write or update occurs, the job will either fail or enter the deferred synchronous mode depending on the synchronous mode failure option 74.

For a single open mount, the volume 16 is only opened in one cluster. For a single mode, the preference is to select a synchronous mode cluster, followed by an immediate copy cluster, and further followed by a deferred copy cluster to satisfy the mount. If a write occurs, then the replication mode 62 for the cluster is set to the deferred synchronous mode, where writes are allowed to continue without being synchronized and the replication mode 64 switches back to synchronous node after all the write data is consistent in the volume 16 through an asynchronous or deferred replication operation. Single open mounts are intended for when the host 4 application wants to perform reads and only needs one copy open for access.

Figure 6:
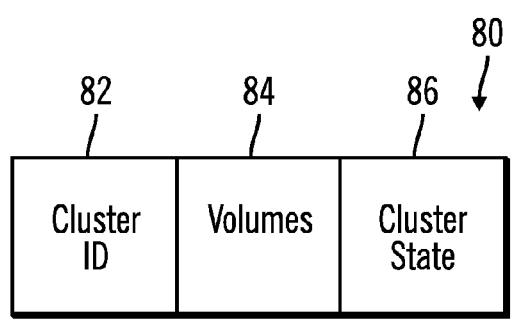
FIG. 6 illustrates an embodiment of cluster information.

FIG. 6 illustrates an embodiment of cluster information 80 including a cluster identifier (ID) 82, volumes 84 loaded or mounted in the cluster 82 non-volatile storage, and a cluster state 86. If any of the volumes 84 mounted at the cluster 82 have a synchronous deferred mode, as indicated in the replication mode 62 for the cluster 82 for the volume replication rule 50, then the cluster has a synchronous deferred cluster state 86. In this way, a cluster 82 enters a synchronous deferred state when at least one volume 84 mounted at the cluster 82 fails to synchronize as required. Those volumes in the synchronous deferred mode are then synchronized at a later time via one of the other deferred methods. Once all volumes 84 for the cluster 82 which went into the synchronous deferred mode are switched back to the synchronous mode, the cluster 82 exits the synchronous deferred state, which is updated in the cluster state 86. A volume that enters the synchronous deferred mode state remains in that state after the demount/RUN until the volume is synchronized to the non-volatile storage at some time later. Once all volumes return to the synchronous mode state and none are behind, then the library/cluster exists that synchronous deferred state.

Figure 7:
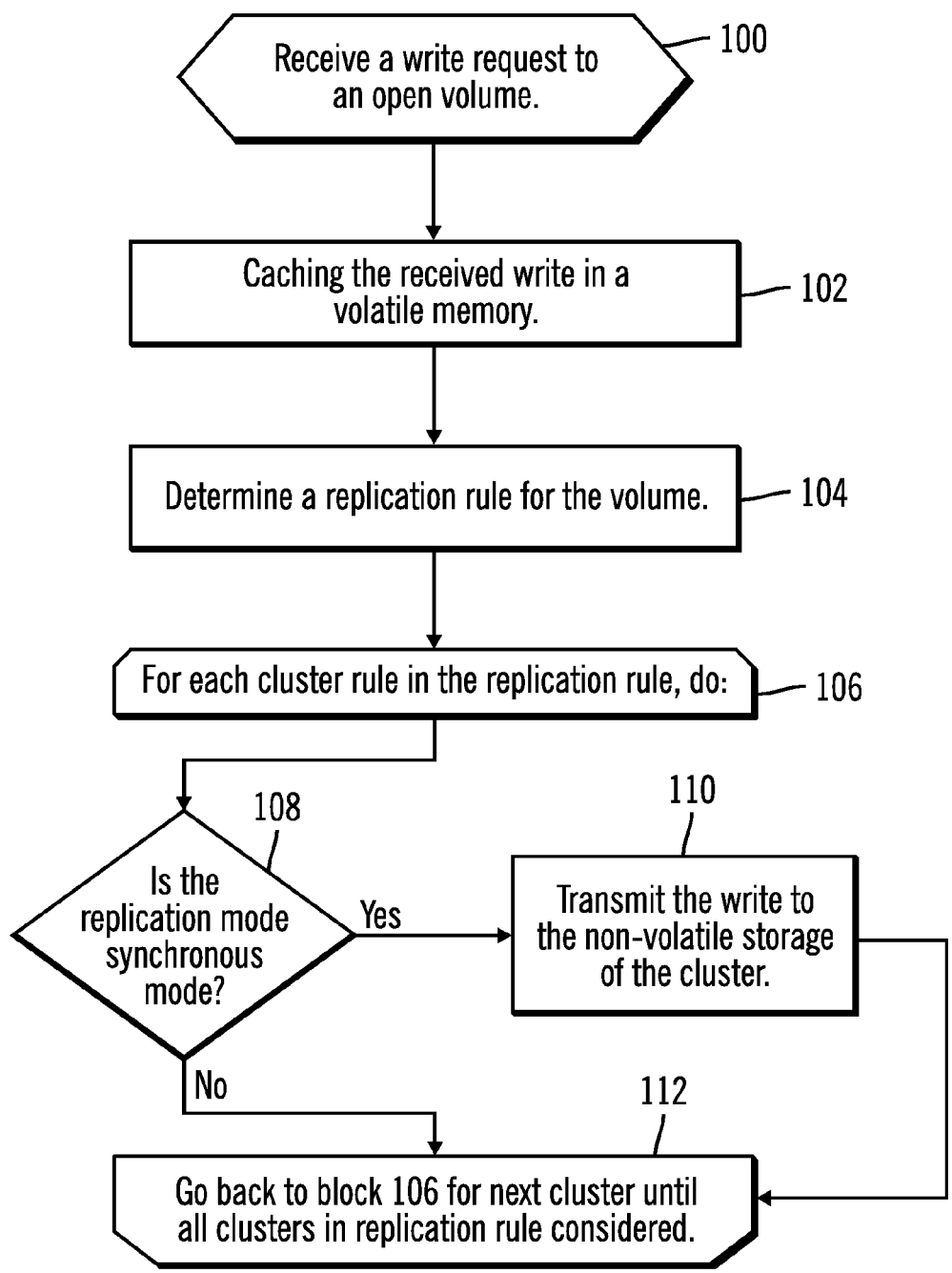
FIG. 7 illustrates an embodiment of operations to process a write request to an open volume.

FIG. 7 illustrates an embodiment of operations performed by the replication manager 28 and/or storage manager 24 to process a write request to an open volume 16 in the non-volatile storage 14. Upon receiving (at block 100) the write request, the storage manager 24 (or other component) may cache (at block 102) the write request in the cache 32. The replication manager 28 determines (at block 104) a replication rule 26 for the volume 16 and then performs a loop of operations at block 106 through 112 for each cluster rule 54a, 54b, 54c identified in the replication rule 50. In certain embodiments, the rules are determined at open time, so when each write arrives, the rules for the clusters 4a, 4b, 4c are known and stored and then used during each write operation. At block 108, if the replication mode 62 for the cluster rule 54a, 54b, 54c being considered indicates the synchronous mode, then the write is transmitted (at block 110) from the cache 32 to the non-volatile storage 14 of the cluster 4a, 4b, 4c being considered. In this way, the write in the cache 32 is duplexed directly to the non-volatile storages 14 of the synchronous mode clusters 4a, 4b, 4c, where the non-volatile storage 14 may be local to or remote with respect to the cluster 4a, 4b, 4c processing the write request from the host 2. If (at block 108) the replication mode is not synchronous, but a deferred mode or no replication or after initiating the transmitting of the write (at block 110), control proceeds (at block 112) to block 106 to consider the next cluster rule 54a, 54b, 54c until all cluster rules are considered.

In the embodiment of FIG. 7, the duplex writes are transferred directly from the volatile memory cache 32 to the non-volatile storage 14 of the clusters 4a, 4b, 4c. Writes from the cache 32 to the clusters may be in parallel and not serialized to improve performance. In this way, a read from the non-volatile storage is not required to replicate. In an alternative embodiment, the data may be written to the non-volatile storage 14 of the receiving cluster 4a, 4b, 4c, and then from that non-volatile storage 14 read out and written to the second cluster.

Figure 8:
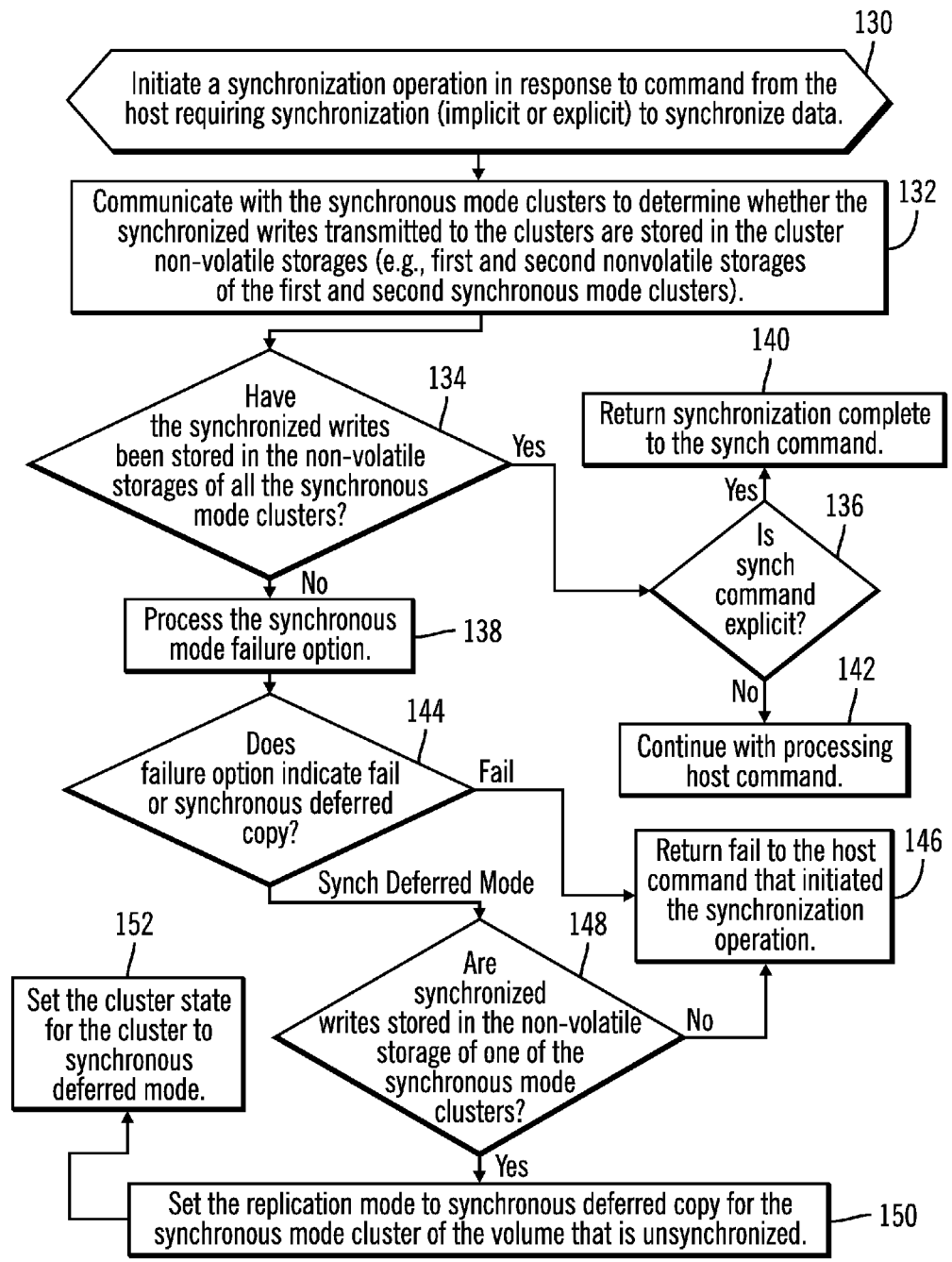
FIG. 8 illustrates an embodiment of operations to process an explicit or implicit synchronization command.

FIG. 8 illustrates an embodiment of operations performed by the replication manager 28 or storage manager 24 to perform synchronization of writes at the synchronous mode clusters 4a, 4b, 4c. Upon initiating (at block 130) a synchronization operation in response to command from the host requiring synchronization (implicit or explicit) the replication manager 28 communicates (at block 132) with the synchronous mode clusters 4a, 4b, 4c to determine whether writes transferred as part of a synchronization operation to the synchronous mode clusters are stored in the cluster non-volatile storages 14 (e.g., first and second non-volatile storages of the first and second synchronous mode clusters). In certain embodiments, the communication may be a forced communication, such as issuing a cluster-sync request which when returned successfully implies that cluster and all points in between have been flushed and now all data is stored in the non-volatile storage 14. If (at block 134) synchronized writes were successfully stored in the non-volatile storages 14 of the synchronous mode clusters 4a, 4b, 4c and if (at block 136) the host command initiating the synchronous operation is explicit, then synchronization complete is returned (at block 140) to the explicit synchronization command. Otherwise, if the synchronization is implicit in the host command, then the storage manager 24 or replication manager 28 continues (at block 142) with processing of the host command.

In certain embodiments, the forced communication of the cluster-synch request may be at a volume or object level instead of for all content. This allows synchronous events to consume less computational resources because the system may only need to keep track of synchronizing for a particular volume.

If (at block 134) the synchronized writes were not successfully synchronized to all the synchronous mode clusters 4a, 4b, 4c, then the replication manger 28 processes (at block 138) the synchronous mode failure option 74 for the volume 16. If (at block 144) the failure option 74 is job fail, then fail is returned (at block 146) to the host command that initiated the synchronization operation. If (at block 144) the failure option 72 is downgrade to synchronous deferred mode, then a determination is made (at block 148) as to whether the synchronized writes were successfully stored in the non-volatile storage 14 of one of the synchronous mode clusters 4a, 4b, 4c. If (at block 148) there is no synchronous mode cluster 4a, 4b, 4c to which writes are synchronized, then control proceeds to block 146 to return fail to the host command. If (at 148) there is one synchronous mode cluster 4a, 4b, 4c synchronized, then the replication mode 62 for that volume 52 and cluster 60 is set (at block 150) to synchronous deferred copy for the unsynchronized synchronous mode cluster, i.e., whose non-volatile storage 14 does not store the synchronized volume.

Figure 9:
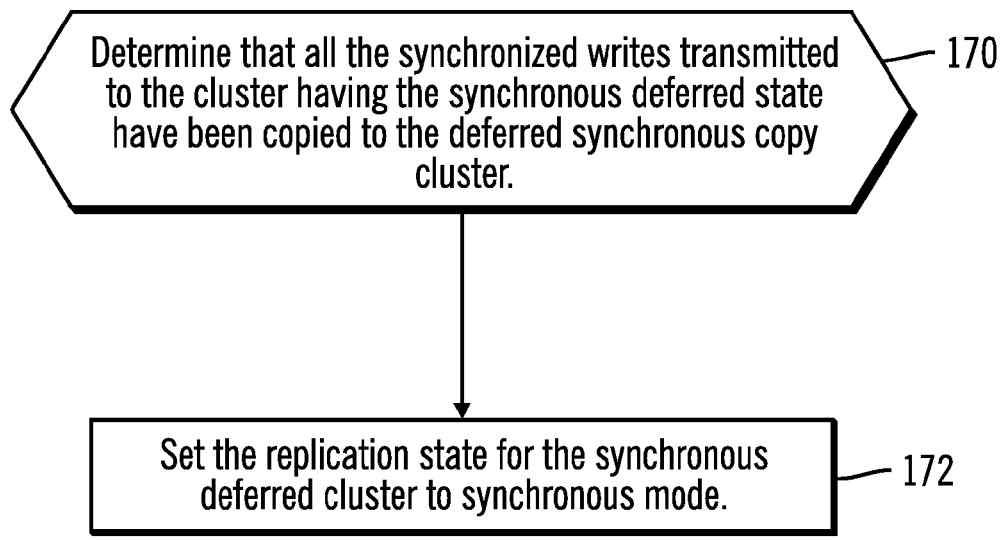
FIG. 9 illustrates an embodiment of operations to update the status of a cluster in a synchronous deferred mode.

The cluster state 86 for the cluster having the volume not synchronized is set (at block 152) to synchronous deferred mode, FIG. 9 illustrates an embodiment of operations performed by the replication manager 28 to adjust the cluster state 86 (FIG. 6) of the cluster having the synchronous deferred state. Upon determining (at block 170) that the synchronized writes transmitted to the cluster 4a, 4b, 4c having the synchronous deferred state have been stored in the non-volatile storage 14 of such cluster, the cluster state 86 for the synchronous deferred state cluster 4a, 4b, 4c is set back (at block 172) to synchronous mode indicating that writes are now synchronized there, such as the library exiting the sync-deferred state. The cluster having the synchronous deferred state may be synchronized as part of a deferred copy or immediate copy operation performed when host 2 access to the volume 16 is complete.

Figure 10:
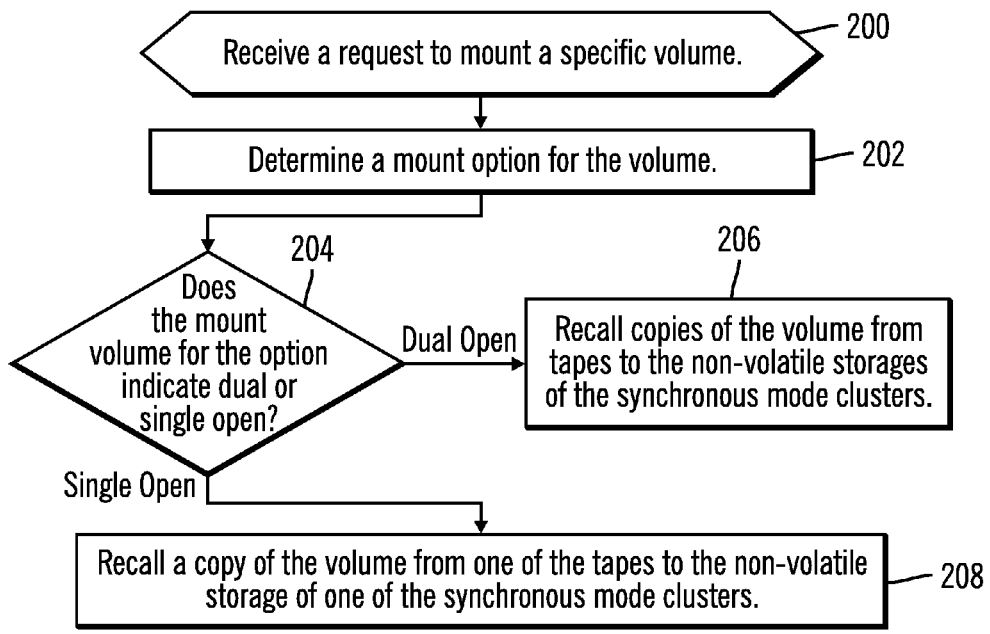
FIG. 10 illustrates an embodiment of operations to mount a specific volume.

FIG. 10 illustrates an embodiment of operations performed by the storage manager 24 to mount a specific volume 200 to which a host 2 wants to read and/or append write data. The storage manager 24 determines (at block 200) the mount option 76 for the volume 16 to mount. If (at block 204) the mount option 76 indicates dual open, then the storage manager 24 may optionally recall (at block 206) copies of the volume from the tapes 20 to the non-volatile storages 14 of the synchronous mode clusters if needed. In alternative embodiments, the volume may be already maintained in the non-volatile storage 14. If (at block 204) the mount option 76 indicates single open, then the storage manager 24 recalls (at block 208) a copy of the volume 6 from one of the tapes 20 to the non-volatile storage 14 of one of the synchronous mode clusters, which may comprise a primary cluster.

Figure 11:
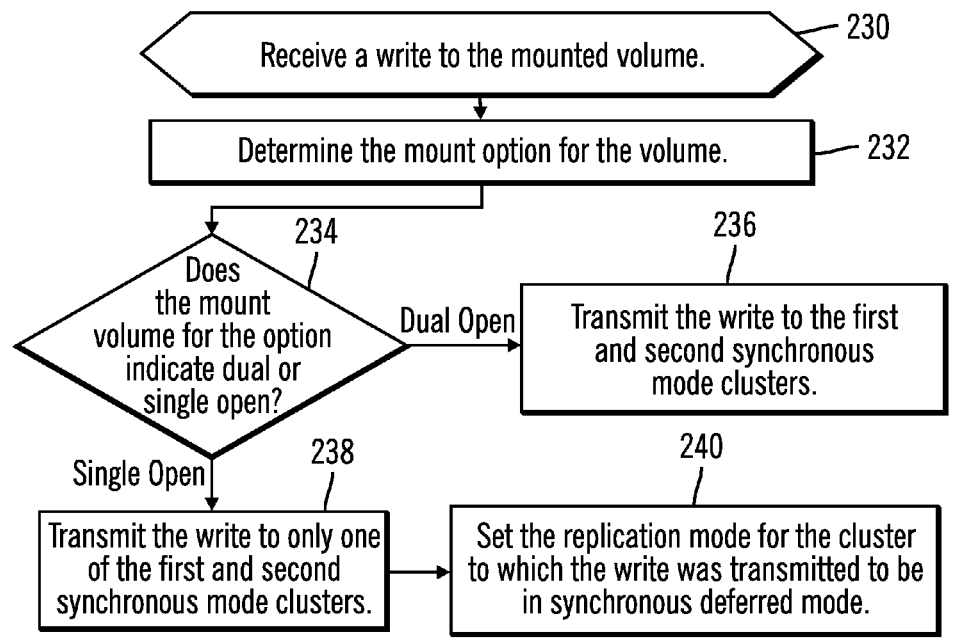
FIG. 11 illustrates an embodiment of operation to process a write to a mounted volume.

FIG. 11 illustrates an embodiment of operations performed by the storage manger 24 and/or replication manager 28 to process a write to append to a mounted volume 16, i.e., volume 16 open in the non-volatile storage 14 of one or more synchronous mode clusters 4a, 4b, 4c. This operation may be performed as part of a private mount option where the host 2 opened a particular volume to append or read data. Upon receiving (at block 230) the write to append, the replication manager 28 determines (at block 232) the mount option 76 for the volume. If the mount option 76 is dual open, then the replication manager 28 transmits (at block 236) the synchronous mode clusters 4a, 4b, 4c from the cache 32. If (at block 234) the mount option indicates single open, then the write is transmitted (at block 238) to only one of the synchronous mode clusters, such as a designated primary synchronous mode cluster. The replication mode 52 for the cluster to which the write was transmitted is set (at block 240) to the synchronous deferred mode where writes are allowed to proceed without having to be synchronized and the data is later synchronized, such as during a deferred mode operation, e.g., immediate copy, deferred copy.

In certain implementation, writes are appended to the volume open in both synchronous mode clusters. However, data appended may not be consistent with the two duplexed copy. For instance, if not all data reaches the synchronous mode clusters in the event of a failure after a last successful synchronization point, but after the last appended writes, the synchronous mode clusters have a different number of appended blocks. To address this, the host 2 should only append data that is validated. To validate, the replication manager 28 may perform a cyclical redundancy check (CRC) on the last number of bytes from the point of append of both synchronous mode copies to make sure that both synchronous mode clusters are consistent up to the last number of bytes. If this check passes, then the append will be allowed.

In the described embodiments, the duplexing of the writes is performed in the clusters as opposed to the host making the duplexing and replication of writes is transparent to the host, and replication is performed from a cluster cache to synchronous mode clusters. With the described embodiments, the fail option may be set to allow for different options (fail, sync-deferred) and other information may allow configuration of a private access mode, where a specific volume is recalled, to open the volume at one or both locations for read and possible update. Further, with described embodiments, the writes are buffered in the cache 32 and transmitted out to the non-volatile storage 14 of each appropriate synchronous cluster 4a, 4b, 4c (FIG. 1), such that the data is synchronized at the synchronous mode cluster points. The described embodiments further provide volume granular recovery point objectives.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an application specific integrated circuit (ASIC), field programmable gate array (FPGA), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for replicating data from a host to at least a first cluster and second cluster, the computer program product comprising a non-transitory computer readable storage medium having computer readable program code embodied therein that executes to perform operations, the operations comprising:
    receiving a write to a volume from a host;
    caching the received write in a memory;
    determining a replication rule indicating one of a plurality of replication modes for the first cluster and the second cluster used for replication for the write, wherein one of the replication modes comprises a synchronous mode;
    transmitting the write from the memory to the first cluster to store in a first non-volatile storage of the first cluster in response to the replication rule indicating the synchronous mode for the first cluster;
    transmitting the write from the memory to the second cluster to store in a second non-volatile storage in response to the replication rule indicating the synchronous mode for the second cluster; and
    in response to the replication rule indicating the replication mode other than the synchronous mode for the first or second cluster, performing operations for the replication mode other than the synchronous mode for the first or second cluster for which the replication rule indicates a mode other than the synchronous mode, wherein the mode other than the synchronous mode includes a deferred mode.

2. The computer program product of claim 1, wherein the operations further comprise:
    initiating a synchronization operation to synchronize writes in response to a host command;
    in response to the synchronization operation, determining whether the synchronized writes transmitted to the first and second clusters have been stored in the first and second non-volatiles storages, respectively; and
    processing a failure option to perform failure handling in response to determining that the synchronized writes have not been written to at least one of the first and second non-volatile storages.

3. The computer program product of claim 2, wherein the processing the failure option comprises:
    determining whether the failure option is fail job or downgrade to synchronous deferred mode;
    returning a failure to the host command initiating the synchronization operation in response to determining that the failure option is the fail job;
    determining that the synchronized writes are stored in the first non-volatile storage and not written to the second non-volatile storage in response to determining that the failure option is downgrade to synchronous deferred mode; and
    setting the replication mode for the second cluster to synchronous deferred mode, wherein in clusters having the synchronous deferred mode, writes can continue.

4. The computer program product of claim 3, wherein the operations further comprise:
    determining that the transmitted synchronized writes have been stored in the second non-volatile storage of the second cluster having the synchronous deferred mode; and
    setting the replication mode for the second cluster having the synchronous deferred mode to the synchronous mode in response to determining that the synchronized writes have been stored in the second non-volatile storage.

5. The computer program product of claim 2, wherein in the deferred mode the volume is transmitted to a third cluster, having a third non-volatile storage, after the host has completed accessing the volume, wherein the deferred mode indicates that writes are transferred to the clusters in response to closing access to a volume to which the writes are directed, wherein the operation to synchronize the writes is initiated before access to the volume is closed, and wherein the third cluster having the deferred mode is not checked when performing the synchronization operation for clusters having the synchronous mode.

6. The computer program product of claim 5, wherein the first, second and third clusters comprise virtual tape libraries emulating tape storage of data on the first, second and third non-volatile storage devices, which comprises a faster access storage medium than a tape medium, wherein the host transmits the write request to store on a tape medium, and wherein the deferred mode comprises one of a deferred copy mode or an immediate copy mode, wherein the immediate copy mode requires synchronization of the volume to the cluster before synchronization would occur in the deferred copy mode during a demount process.

7. The computer program product of claim 1, wherein the first cluster includes the memory and receives and caches the host write, and transmits the host write to the first non-volatile storage in the first cluster and transmits to the second cluster to store in the second non-volatile storage.

8. The computer program product of claim 1, wherein the host write request is received at a third cluster including the memory, and wherein the third cluster transmits the write to the first and second clusters to store.

9. The computer program product of claim 8, wherein the operations further comprise:
receiving a request to mount a volume;
determining whether a mount setting indicates dual open or single open;
recalling copies of the volume from tapes to the first and second non-volatile storages in response to determining that the mount setting indicates the dual open; and
recalling a copy of the volume from one of the tapes to only one of the first and second non-volatile storages in one of the first and second clusters having the synchronous mode in response to determining that the mount setting indicates the single open.

10. The computer program product of claim 9, wherein the operations further comprise:
receiving a write to the mounted volume;
determining whether the mount setting for the volume indicates dual open or single open;
transmitting the write to the first and second clusters in response to determining that the mount setting indicates the dual open; and
transmitting the write to a selected synchronous mode cluster comprising one of the first and second clusters in response to determining that the mount setting indicates the single open.

11. The computer program product of claim 10, wherein the operations further comprise:
setting the replication mode for the selected synchronous mode cluster to the synchronous deferred copy mode indicating that writes may continue in an event synchronization while the cluster having the synchronous deferred copy mode has not been synchronized; and
setting the replication mode for the synchronous mode cluster not selected to one of the deferred modes.

12. The computer program product of claim 1, wherein the first and second clusters emulate tape storage of data on the first and second non-volatile storage devices, respectively, wherein the first and second non-volatile storages comprise faster access storage media than a tape medium, wherein the host transmits the write request to store on a tape medium.

13. The computer program product of claim 1, wherein at least one replication mode other than the synchronous mode comprises at least one of: an immediate copy deferred mode; a deferred copy deferred mode; a synchronous deferred mode; and a no replication mode.

14. A system for replicating data from a host to at least a first cluster and second cluster, comprising:
a processor;
a computer readable storage medium having computer readable program code embodied therein that executes to perform operations, the operations comprising:
receiving a write to a volume from a host;
caching the received write in a memory;
determining a replication rule indicating one of a plurality of replication modes for the first cluster and the second cluster used for replication for the write, wherein one of the replication modes comprises a synchronous mode;
transmitting the write from the memory to the first cluster to store in a first non-volatile storage of the first cluster in response to the replication rule indicating the synchronous mode for the first cluster;
transmitting the write from the memory to the second cluster to store in a second non-volatile storage in response to the replication rule indicating the synchronous mode for the second cluster; and
in response to the replication rule indicating the replication mode other than the synchronous mode for the first or second cluster, performing operations for the replication mode other than the synchronous mode for the first or second cluster for which the replication rule indicates a mode other than the synchronous mode, wherein the mode other than the synchronous mode includes a deferred mode.

15. The system of claim 14, wherein the operations further comprise:
initiating a synchronization operation to synchronize writes in response to a host command;
in response to the synchronization operation, determining whether the synchronized writes transmitted to the first and second clusters have been stored in the first and second non-volatiles storages, respectively; and
processing a failure option to perform failure handling in response to determining that the synchronized writes have not been written to at least one of the first and second non-volatile storages.

16. The system of claim 15, wherein the processing the failure option comprises:
determining whether the failure option is fail job or downgrade to synchronous deferred mode;
returning a failure to the host command initiating the synchronization operation in response to determining that the failure option is the fail job;
determining that the synchronized writes are stored in the first non-volatile storage and not written to the second non-volatile storage in response to determining that the failure option is downgrade to synchronous deferred mode; and
setting the replication mode for the second cluster to synchronous deferred mode, wherein in clusters having the synchronous deferred mode, writes can continue.

17. The system of claim 15, wherein in the deferred mode the volume is transmitted to a third cluster, having a third non-volatile storage, after the host has completed accessing the volume, wherein the deferred mode indicates that writes are transferred to the clusters in response to closing access to a volume to which the writes are directed, wherein the operation to synchronize the writes is initiated before access to the volume is closed, and wherein the third cluster having the deferred mode is not checked when performing the synchronization operation for clusters having the synchronous mode.

18. The system of claim 14, wherein the host write request is received at a third cluster including the memory, and wherein the third cluster transmits the write to the first and second clusters to store.

19. The system of claim 14, wherein the first and second clusters emulate tape storage of data on the first and second non-volatile storage devices, respectively, wherein the first and second non-volatile storages comprise faster access storage media than a tape medium, wherein the host transmits the write request to store on a tape medium.

20. The system of claim 19, wherein the operations further comprise:
receiving a request to mount a volume;
determining whether a mount setting indicates dual open or single open;
recalling copies of the volume from tapes to the first and second non-volatile storages in response to determining that the mount setting indicates the dual open; and
recalling a copy of the volume from one of the tapes to only one of the first and second non-volatile storages in one of the first and second clusters having the synchronous mode in response to determining that the mount setting indicates the single open.

21. The system of claim 20, wherein the operations further comprise:
receiving a write to the mounted volume;
determining whether the mount setting for the volume indicates dual open or single open;
transmitting the write to the first and second clusters in response to determining that the mount setting indicates the dual open; and
transmitting the write to a selected synchronous mode cluster comprising one of the first and second clusters in response to determining that the mount setting indicates the single open.

22. The system of claim 21, wherein the operations further comprise:
setting the replication mode for the selected synchronous mode cluster to the synchronous deferred copy mode indicating that writes may continue in an event synchronization while the cluster having the synchronous deferred copy mode has not been synchronized; and
setting the replication mode for the synchronous mode cluster not selected to one of the deferred modes.

23. The system of claim 14, wherein at least one replication mode other than the synchronous mode comprises at least one of: an immediate copy deferred mode; a deferred copy deferred mode; a synchronous deferred mode; and a no replication mode.

24. A method for replicating data, comprising:
receiving a write to a volume from a host;
caching the received write in a memory;
determining a replication rule indicating one of a plurality of replication modes for a first cluster and a second cluster used for replication for the write, wherein one of the replication modes comprises a synchronous mode;
transmitting the write from the memory to the first cluster to store in a first non-volatile storage of the first cluster in response to the replication rule indicating the synchronous mode for the first cluster;
transmitting the write from the memory to the second cluster to store in a second non-volatile storage in response to the replication rule indicating the synchronous mode for the second cluster; and
in response to the replication rule indicating the replication mode other than the synchronous mode for the first or second cluster, performing operations for the replication mode other than the synchronous mode for the first or second cluster for which the replication rule indicates a mode other than the synchronous mode, wherein the mode other than the synchronous mode includes a deferred mode.

25. The method of claim 24, further comprising:
initiating a synchronization operation to synchronize writes in response to a host command;
in response to the synchronization operation, determining whether the synchronized writes transmitted to the first and second clusters have been stored in the first and second non-volatiles storages, respectively; and
processing a failure option to perform failure handling in response to determining that the synchronized writes have not been written to at least one of the first and second non-volatile storages.

26. The method of claim 25, wherein the processing the failure option comprises:
determining whether the failure option is fail job or downgrade to synchronous deferred mode;
returning a failure to the host command initiating the synchronization operation in response to determining that the failure option is the fail job;
determining that the synchronized writes are stored in the first non-volatile storage and not written to the second non-volatile storage in response to determining that the failure option is downgrade to synchronous deferred mode; and
setting the replication mode for the second cluster to synchronous deferred mode, wherein in clusters having the synchronous deferred mode, writes can continue.

27. The method of claim 25, wherein in the deferred mode the volume is transmitted to a third cluster, having a third non-volatile storage, after the host has completed accessing the volume, wherein the deferred mode indicates that writes are transferred to the clusters in response to closing access to a volume to which the writes are directed, wherein the operation to synchronize the writes is initiated before access to the volume is closed, and wherein the third cluster having the deferred mode is not checked when performing the synchronization operation for clusters having the synchronous mode.

28. The method of claim 24, wherein the host write request is received at a third cluster including the memory, and wherein the third cluster transmits the write to the first and second clusters to store.

29. The method of claim 24, wherein the first and second clusters emulate tape storage of data on the first and second non-volatile storage devices, respectively, wherein the first and second non-volatile storages comprise faster access storage media than a tape medium, wherein the host transmits the write request to store on a tape medium.

30. The method of claim 29, further comprising:
receiving a request to mount a volume;
determining whether a mount setting indicates dual open or single open;
recalling copies of the volume from tapes to the first and second non-volatile storages in response to determining that the mount setting indicates the dual open; and
recalling a copy of the volume from one of the tapes to only one of the first and second non-volatile storages in one of the first and second clusters having the synchronous mode in response to determining that the mount setting indicates the single open.

31. The method of claim 30, further comprising:
receiving a write to the mounted volume;
determining whether the mount setting for the volume indicates dual open or single open;
transmitting the write to the first and second clusters in response to determining that the mount setting indicates the dual open; and transmitting the write to a selected synchronous mode cluster comprising one of the first and second clusters in response to determining that the mount setting indicates the single open.

32. The method of claim 31, further comprising:
setting the replication mode for the selected synchronous mode cluster to the synchronous deferred copy mode indicating that writes may continue in an event synchronization while the cluster having the synchronous deferred copy mode has not been synchronized; and
setting the replication mode for the synchronous mode cluster not selected to one of the deferred modes.

33. The method of claim 24, wherein at least one replication mode other than the synchronous mode comprises at least one of: an immediate copy deferred mode; a deferred copy deferred mode; a synchronous deferred mode; and a no replication mode.

* * * * *